United States Patent [19]

Ozima

[11] 4,078,133
[45] Mar. 7, 1978

[54] PROCESS FOR PRODUCING WATER-SOLUBLE VINYL HIGH-POLYMERS BY REVERSED-PHASE EMULSION POLYMERIZATION

[76] Inventor: Kazutaka Ozima, 1573-133 Tottori, Hannan-cho, Sennan, Osaka, Japan

[21] Appl. No.: 744,954

[22] Filed: Nov. 26, 1976

[30] Foreign Application Priority Data

Dec. 1, 1975 Japan ............................. 50-143725
Dec. 1, 1975 Japan ............................. 50-143726
Jun. 17, 1976 Japan ............................. 51-72059

[51] Int. Cl.$^2$ ........................... C08F 2/00; C08F 20/70
[52] U.S. Cl. ..................................... 526/80; 526/87; 526/206; 526/207; 526/303
[58] Field of Search ............... 526/206, 303, 207, 79, 526/80, 81, 87, 88

[56] References Cited

U.S. PATENT DOCUMENTS

| | | | |
|---|---|---|---|
| 2,982,749 | 5/1961 | Friedrich et al. | 526/303 |
| 2,983,717 | 5/1961 | Henley et al. | 526/303 |
| 3,211,708 | 10/1965 | Zimmermann et al. | 526/206 |
| 3,278,506 | 10/1966 | Chamot et al. | 526/207 |
| 3,284,393 | 11/1966 | van der Hoff et al. | 526/911 |
| 3,957,739 | 5/1976 | Cabestany et al. | 526/303 |
| 3,975,341 | 8/1976 | Trapasso | 526/303 |
| 4,037,040 | 7/1977 | Trapasso et al. | 526/207 |

Primary Examiner—Herbert J. Lilling
Attorney, Agent, or Firm—Blanchard, Flynn, Thiel, Boutell & Tanis

[57] ABSTRACT

An improved process for producing powdery water-soluble vinyl high-polymers by reversed-phase emulsion polymerization. The vinyl monomer is polymerized in the form of W/O type emulsion dispersed as an aqueous solution in a non-polar organic solvent immiscible with water and having a boiling point in the polymerization temperature range of the vinyl monomer, under stationary evaporation and reflux of part of the solvent, whereby the oxygen in the polymerization system is completely removed and thus the polymerization is enhanced to achieve an extremely high polymerization degree. Further, the aqueous solution of the monomer is added and dispersed in the polymerizing system stepwise or continuously at such a rate that the concentration of the polymer produced in the particles of the emulsion is maintained to a value of 20% or more to the completion of the reaction, whereby the dispersed particles are substantially completely prevented from agglomeration by virtue of the non-tackiness of the particles having a high concentration of the polymer.

9 Claims, No Drawings

PROCESS FOR PRODUCING WATER-SOLUBLE VINYL HIGH-POLYMERS BY REVERSED-PHASE EMULSION POLYMERIZATION

The invention relates to an improved process for producing, by reversed-phase emulsion polymerization, water-soluble vinyl high-polymers such as polyacrylamide and polyacrylic acid in the form of a dry fine powder suitable for use in a wide range of applications, such as sizing agents and coating agents in paper-making and for textile fibers, thickeners of aqueous dispersed systems, high-polymeric flocculants or coagulants for waste-water treatment, etc., and particularly for manufacturing polymers of high polymerization degree effective as a flocculant for waste-water treatment, in the form of a dry fine powder readily soluble in water.

Usually water soluble vinyl monomers are polymerized by the so-called aqueous-solution polymerization process. In this process, however, it is difficult to obtain polymers of high polymerization degree in high concentrations because the viscosity of the solution, which rapidly rises to extremely high values as the polymerization proceeds, makes it difficult to control the reaction temperature, stirring, etc., and mechanical difficuties may occur in the drying and powder-forming steps of the thus obtained polymers.

A so-called "reversed-phase emulsion polymerization" method is also known in which a water soluble monomer mixed with a small quantity of water is dispersed in a non-polar organic solvent, which is immiscible with water and the monomer, by means of an emulsifying agent, and is polymerized in the form of water-in-oil (W/O) emulsion. This method, which is fundamentally different in its mechanism from the others, e.g., aqueous-solution polymerization, promises to give high polymers in high concentrations at high polymerization rates while the viscosity of the emulsion is kept low. The polymers, being in the form of colloidal particles containing a small quantity of water, may readily be converted into dry fine powder by suitable means. This method, however, has not been of practical value in manufacturing efficiently and economically such water-soluble vinyl polymers of high polymerization degree. One reason is that non-polar organic solvents usually contain dissolved oxygen, which acts as an inhibitor of vinyl polymerization, in an amount as much as ten times the amount contained in water, at atmospheric pressure and the temperature range used in ordinary vinyl polymerization, thus making it difficult to obtain vinyl polymers of high polymerization degree because an effective method of eliminating oxygen from the polymerization system is unavailable. Another reason is that agglomeration of polymer particles may largely occur during polymerization because of the poor stability per se of the W/O type emulsion in comparison with a O/W type emulsion, which makes it difficult to carry out the polymerization efficiently like O/W type emulsion polymerization.

It is an object of the present invention to provide an improved process for producing water-soluble powdery vinyl polymers of high polymerization degree by reversed-phase emulsion polymerization, efficiently and economically.

Another object of the invention is to provide an improved process for producing dry fine powder of vinyl high-polymers which have excellent properties as flocculants or coagulants of aqueous dispersed systems and water suspensions thus effecting a great performance when used in extremely small quantities.

Still another object of the invention is to provide a process for producing dry fine powder of vinyl high-polymers readily soluble in water and thus permitting easy handling in transportation, application, etc.

The present invention comprises as essential improvements two features which are closely related each other in the process of reversed-phase emulsion polymerization of water-soluble vinyl monomers. One of them is the complete removal of oxygen, which acts as an inhibitor of polymerizatin, particularly in emulsion polymerization of such vinyl monomers, from the reaction system by simple means, thus permitting the formation of polymers of high molecular weight without using or using only a minor quantity of initiator (polymerization catalyst). The other is to suppress the formation of bulk or blocked polymer particles produced by agglomeration of dispersed polymer particles during the reaction, which has been one of the greatest difficulties in emulsion polymerization including O/W type (oil-in-water type), thus giving large yields of powdery polymers, per reacting vessel, by the use of relatively small quantities of emulsifiers.

It is well known that, when an organic solvent is heated to its boiling point, the gases such as oxygen dissolved in the solvent are completely removed from the liquid phase by distillation along with the vapor of the solvent. This phenomenon is ingeniously utilized in the invention. If the reversed-phase emulsion polymerization is carried out, in a vessel with a reflux condenser at its top, at the boiling temperature of the solvent constituting the continuous phase of the emulsion, and if the balance of incoming and outgoing heat through the vessel walls, loss at the condenser, generation by the reaction, etc., is adequately controlled so that a stationary reflux is established by the evaporation and condensation at the condenser of a small portion of the solvent, the polymerization will proceed under a condition perfectly free of oxygen in the reaction system. In addition, when a mixture of two or more organic solvents, soluble with each other and having different boiling points is boiled, providing no azeotropic mixture is formed, at a temperature between the highest and lowest boiling points thereof and the boiling point is gradually raised while generating a vapor enriched with the lower boiling fractions. If such a mixture of solvents or a solvent having itself a boiling temperature range, e.g. petroleum ether, is used as the continuous phase (dispersion medium) in the reversed-phase emulsion polymerization, it will be very favorable in maintaining the desired heat balance of the reaction system by controlling the temperature of the vessel walls and the evaporation rate. It is further preferable to provide a column packed with Raschig rings at the bottom of the condenser, so that even a trace of oxygen that might be dissolved in the dropping condensate will be removed by the countercurrent contact with the rising solvent vapor at the Raschig rings. The inventor has confirmed that such a method of reversed-phase emulsion polymerization will smoothly promote the polymerization with substantially no induction period, without using or by using an initiator (benzoyl peroxide) in a quantity of about 1/20 the minimum quantity required to activate the reaction in a similar reversed-phase emulsion polymerization but wherein a flow of, for example, 99.99% nitrogen gas is used for the removal of oxygen. The inventor has further recognized that even commercially available acrylamide and acrylic acid containing inhibitors as a stabilizer can be polymerized by such reversed-phase emulsion polymerization at a good rate without any purification and without any initiator. This may also show that complete removal of oxygen from the reaction system effectively maintains the free radicals derived from the sources other than initiators.

The viscosity of the aqueous solution of the products shows that the reversed-phase emulsion polymerization according to the invention gives markedly higher polymerization degrees than those depending on other methods of oxygen removal.

On the other hand, a W/O type or reversed-phase emulsion is generally poor in its stability in comparison with a O/W (oil-in-water) type emulsion because of the non-polar organic solvent use as the dispersion medium, since it gives the dispersed particles no protective ionic layer against agglomeration, such as might be given in a O/W type emulsion by the adsorption to the dispersed particles with ionic ends of the emulsifier arranged outwardly. Accordingly, a reversed-phase emulsion polymerization which is subject to such unstable condition can generally be carried out stably only by use of an emulsifier employed in a great ratio to the monomer, or otherwise allowing the generation of large amounts of agglomerates. The inventor has noticed the fact that an aqueous solution of a water-soluble polymer will form a nontacky gel having rubber-like elasticity when its concentration is above 20%, and considered this may also be true of dispersed polymer particles during the reversed-phase emulsion polymerization. Thus, it has been confirmed that agglomeration of polymer particles during reversed-phase emulsion polymerization is extremely reduced if the mixture of monomer and water, hereinafter called monomer composition, is added to the polymerization system during the entire period of polymerization except the initial stage, stepwise or continuously, at a rate restricted in accordance with the consumption of the monomer and with the increase of the polymer so that the concentration of the polymer in the dispersed particles can always be maintained above 20%. It is favorable for the stepwise addition of the monomer that the polymerization or consumption rate of the monomer is substantially constant during the major part of the polymerization period except the initial and final stages, as reported by a number of research reports on emulsion polymerization.

At the initial stage of the process, a monomer composition present in an amount less than twice the amount of the emulsifier (surfactant) in the system is considered to be in a condition entirely absorbed in micelles formed by the surfactant, that is, in a solubilized state, so that the polymerization under such condition will cause the least agglomeration, even if the polymer concentration is below 20%. It was confirmed actually that the addition of the monomer composition in said amounts at the initial stage caused substantially no agglomeration and gave a rather favorable influence to the process thereafter for stable polymerization.

Further, more complete prevention of agglomeration of polymer during the reaction will be effected if the monomer composition to be added stepwise is in the form of an emulsion, preferably a W/O type emulsion, dispersed in a mixture of the solvent and emulsifier similar to those used in the initial stage. This is considered to be due to the fact that because the monomer composition, being added as an emulsion, is thereby introduced as colloidal particles into the reaction system, and it is more readily and promptly absorbed into the polymerization sites or dispersed particles than it might be if it were added as non-emulsified drops.

The above mentioned method of removing oxygen from the system by the vapor of the organic solvent co-operates particularly advantageously with those methods of stepwise addition of the monomer composition. The monomer composition introduced stepwise carries inevitably some oxygen dissolved therein into the system, but the oxygen is eliminated along with the vapor of the solvent in the course of diffusion of the monomer composition through the continuous phase of the solvent to the polymerization sites; thus, the difficulties caused by the contamination of the reactant with oxygen, such as retardation of the reaction and lowering of polymerization degree, are minimized. In addition, the method of removing oxygen by the vapor of solvent, forming an open system through the condenser, permits very easy adding of the monomer composition to the system in comparison with a pressurized closed system.

The non-polar organic solvents employed to form the continuous phase (dispersion medium) in the W/O type emulsion of the invention are solvents of poor miscibility with water, including linear, branched, and cyclic hydrocarbons, aromatic hydrocarbons, chlorinated hydrocarbons, etc. However, solvents which have large chain-transfer constants such as chlorinated hydrocarbons do not necessarily show a favorable effect on the polymerization degree of the products. Those having too high boiling points are unfavorable because the resultant polymers may be subjected to degeneration such as cross linking in the process of atmospheric distillation, which is the usual means of separating the solvent from the polymer in the present invention. The solvent itself should also be free from degeneration in order to stand repeated use after separation from the polymer, as described later. Thus, the most preferable solvents are linear, branched, and cyclic saturated hydrocarbons, or petroleum fractions comprising mainly a mixture of such hydrocarbons.

The water soluble vinyl monomers to be polymerized according to the process of the invention include those which are incompatible with said organic solvents and capable of vinyl polymerization individually or in combination, typified by acrylamide, methacrylamide, acrylic acid and salts thereof, 2-(dimethylamino)ethyl methacrylate and salts thereof, and 2-(dimethylamino)ethyl acrylate and salts thereof, which are readily polymerized individually, and in a mixture of any proportion with each other. N-vinyl-2-pyrrolidone, salts of methacrylic acid, and N,N'-methylene-bis-acrylamide are also usuable, being added to the above compounds. Those which solidify at the reaction temperature are used with the addition of at least the minimum quantity of water required to liquify same. Those which are ionic, such as acrylic acid and 2-(dimethylamino)ethyl methacrylate, are preferably neutralized at least partly with an alkali or an acid to form salts and added with water, so that the solubility thereof in non-polar organic solvents is further reduced to improve the phase distribution.

The emulsifiers available in the process of the invention are those which are capable of readily forming a W/O type emulsion of said monomer-water mixture dispersed in said mixture of non-polar organic solvents, that is emulsifiers, having an "HLB" value (hydrophilic lipophilic balance) of 3 to 10, having a hydrophilic group smaller than the lyophilic group, typified by polyoxyethylene alkyl ethers, polyoxyethylene alkylphenol ethers, and polyoxyethylene fatty acid esters, having relatively small numbers of added oxyethylene groups, and fatty acid esters of polyhydric alcohols. Lanolin and fatty acid salts with polyvalent metals are also available. The use of the emulsifier in an amount of 1 to 20% by weight, preferably 10% by weight, based on the monomer-water mixture used, permits favorable reaction at a high polymerization rate without substantial agglomeration of the polymer. The use less than 1% of emulsifier cannot effect stable reversed-phase emulsion polymerization, and more than 20% of emulsifier is uneconomical.

As the initiator (polymerization catalyst), if one is used in the present process, mention may be made of any one of oil soluble and water soluble initiators adapted for use in general vinyl polymerization, typified by benzoyl peroxide, persulfates, and azo-bis-isobutyronitrile, and by a redox system comprising co-use of the above one with a reducing agent. The amount of these initiators should be adequately controlled according to their rate of activation, reaction temperature, polymerization degree of the polymer to be obtained, etc., but it is generally preferred to be in a range from 0.001 to 0.1 mol% of the monomer used.

In a preferred embodiment of the present invention, there is provided a reaction vessel having at its top a reflux condenser including, preferably, a column packed with Raschig rings and an inlet port for the monomer composition. The vessel is further provided with a stirrer and temperature-control means.

The required amounts of the organic solvent mixture and the emulsifier are put into the vessel to form a solution and an amount of the monomer composition (aqueous solution of the vinyl monomer) less than twice the amount of the emulsifier is dispersed in the solution in the form of W/O type emulsion. If an oil soluble initiator is to be used, it may be added at this stage. A water soluble initiator may be dissolved in advance in the total amount of the monomer composition, but it is particularly preferable to use the whole quantity of it dissolved in the monomer composition to be added at the initial stage (as later described) to said solution.

The polymerization temperature to be employed in the process of the invention is preferably in the range from 30° to 60° C. A higher temperature may cause side reactions unfavorable to the polymer, such as cross linking, depending on the type of monomer, e.g. acrylamide, used. A lower temperature is impracticable because of difficulties in selecting the solvent.

The mixture in the vessel is heated and held at the polymerization temperature, which is also the boiling point of the solvent, under continuous stirring, whereupon part of the solvent is evaporated and then condensed in the condenser at the top of the vessel to drop down, thus stationary reflux is established, and polymerization starts in the emulsion. After the polymerization of the monomer dispersed in the emulsion has been fairly advanced in this initial stage, the rest of the monomer composition is added to the system through the inlet port stepwise or continuously at such a rate that the concentration of the polymer formed in the dispersed particles can be maintained at a value of 20% or more by weight, in this embodiment. Said rate of addition is preferably determined in advance by preliminary tests including analysis of polymer concentration in the dispersed system.

The concentration of the polymer in the dispersed particles during the process can be readily determined. A small sample of the reaction mixture is put into a non-solvent for the polymer, such as acetone or methanol, and the percipitated polymer is collected by filtration or other method and dried. Calculation by use of the ratio of the dried polymer to the total quantity of the monomer composition added till then will give the required concentration of the polymer.

More favorable results may be obtained if the rest of the monomer composition is added to the reaction system in the form of an emulsion dispersed in an immiscible organic solvent. In this case, a mixture of organic solvent and emulsifier similar to the previously described ones may be used as the medium, but preferably least quantities of the same solvent and emulsifier are used, shared from the total amounts required in the whole process, in order to make possible the repeated use of the solvent and the emulsifier. Since small amounts, for example, of 0.5% by weight of the emulsifier and 60% by volume of the solvent based on the amount of the rest of the monomer composition can maintain a stable W/O type emulsion by slow stirring only, the division of such amounts for this purpose will give substantially no disadvantageous influence on the total reaction conditions including polymerization rate. This method has particularly made it possible by use of about 10 wt%, based on the monomer composition, of the emulsifier to limit the yield of agglomerates to less than 1% of the dispersed polymer produced by the reversed-phase emulsion polymerization up to the equal volume of the total monomer composition to the total volume of the solvent mixture used. In holding the monomer-water emulsion to be added, the use of inactive-gas flow may be favorable for obtaining particularly high polymers, but usually it is not necessarily required.

In another embodiment of the invention, the total amount of the monomer composition is added to the reaction system stepwise or continuously (without addition of a certain amount at the initial stage) under said conditions. This may also give good results without any trouble.

It is preferred to continue the heating and stirring for a certain period after the stepwise or continuous addition of the monomer composition is finished, to complete the conversion of the unreacted monomer into polymer.

Having thus completed the polymerization, the solvent constituting the continuous phase is separated from the emulsion and is recovered mostly by simple distillation in the form adapted to re-use. The distillation residue is agitated with crushing in a solvent, e.g. acetone and methylethyl ketone, which is a good solvent for the emulsifier but a poor solvent for the polymer, and then filtered and centrifuged to recover the polymer. This operation is repeated several times with new solvent to give a polymer free of the emulsifier, which polymer is then dried to give purified granular polymer which can be readily reduced into fine powder. The emulsifier extracted by said solvent is freed by simple distillation from the solvent and is purified mainly by washing, depending upon its insolubility in water, into a condition suitable for re-use in another operation.

Thus, the improved process of reversed-phase emulsion polymerization according to the present invention gives purified and dry vinyl polymer of high polymerization degree very economically in the form of a fine powder possessing excellent water solubility. It is also possible to provide anionic and cationic as well as nonionic polymers adapted to a variety of applications particularly in the field of high polymeric flocculants, by selecting adequately the monomers and their combination to be used.

The following examples will further illustrate the invention but are not to be considered a limitation thereupon. All the reagents used in the Examples are commercially available ones, used without further purification.

EXAMPLE 1

As the reaction vessel for polymerization, a 100-ml Erlenmeyer flask was provided which was connected at its top with a reflux condenser comprising an upper spiral tube of 30 mm in external diameter and 150 mm high and a lower column of 10 mm in inside diameter and 50 mm long packed with Raschig rings, and the flask was placed in a water bath and provided with a magnetic stirrer.

A mixture of 35 ml of n-hexane, 35 ml of petroleum ether having a boiling range from 30° to 70° C, and 15 ml of isopentane was put into the flask, and a solution of 6 g of acrylamide and 4 g of water was emulsified in it by stirring together with the addition of 3 g of sorbitan monooleate (Span 80), a surface active agent. The emulsion was then mixed with 0.002 g of benzoyl peroxide as the polymerization initiator and heated to 45° C and held there by means of the water bath under continuous stirring. Part of the solvent mixture was evaporated with the raised temperature and started to reflux by the condenser.

In the early stage of heating, the contents of the flask showed the look of an opaque suspension, but after about 20 min of heating it began to assume a bluish appearance of latex, which indicated the progress of emulsion polymerization.

After four hours of heating and stirring, the contents were transferred into another flask and heated to about 70° C to distil off the solvents, and the residue was extracted with acetone to separate the emulsifier and then vacuum-dried to give purified polymer. The polyacrylamide obtained consisted of

| | |
|---|---|
| powdery polymer (polymerized under dispersed condition) | 4.6 g |
| agglomerates (formed during polymerization) | 1.2 g |

The powdery polymer was dissolved in water to a concentration of 0.2%, and the viscosity of the solution was measured at 20° C by means of a Brookfield viscometer. The value obtained was 17 cp.

Control

Eighty-five milliliters of n-hexane (bp. 68.7° C) was put in an Erlenmeyer flask similar to that used in Example 1 but provided additionally with an inlet for nitrogen gas at the upper part of the flask, and the same quantity of the same solution of acrylamide was emulsified in it with the same emulsifier as Example 1.

Then, 0.1 g of benzoyl peroxide was added to the emulsion, and the system was reacted for four hours under stirring at 45° C, while nitrogen gas of 99.99% purity was fed from said inlet into the system at a rate of 100 cc/min. The contents of the flask were purified in the same manner and gave

| | |
|---|---|
| powdery polymer | 4.4 g |
| agglomerates | 0.7 g |

The viscosity of 0.2% aqueous solution of the powdery polymer was about 3 cp at 20° C by Brookfield viscometer.

The use of 0.05 g of benzoyl peroxide instead of 0.1 g gave substantially no polymer after the reaction for 4 hr.

From the comparison of Example 1 with the Control, it is evident that the use of the solvent mixture according to the present invention permits smoother reaction and gives a polymer of much higher polymerization degree than the use of nitrogen gas flow to expel oxygen.

EXAMPLE 2

Each solvent composition shown in Table 1 was used in place of the solvent mixture in Example 1 to perform the polymerization of the same aqueous solution of acrylamide in similar manner. The results obtained are also shown in Table 1.

Table 1

| Solvent composition (volume %) | | Reaction temp. (° C) | Polymer yield (g) | | Viscosity of aq. soln. of polymer (cp) (0.2% con., 20° C) |
|---|---|---|---|---|---|
| | | | Powder | Agglomerates | |
| n-Hexane | 40 | 48 | 5.6 | 0.6 | 15 |
| n-Pentane | 60 | | | | |
| Petroleum ether (b.p. 30–70° C) | | 44 | 5.3 | 0.7 | 16 |
| Benzene | 40 | 53 | 4.4 | 0.8 | 12 |
| n-Pentane | 50 | | | | |
| Cyclohexane | 50 | 42 | 5.5 | 0.5 | 18 |
| i-Pentane | 50 | | | | |
| 1,2-Dichloroethane | 50 | 43 | 4.8 | 0.4 | 14 |
| Petroleum ether | 30 | | | | |
| i-Pentane | 20 | | | | |

EXAMPLE 3

There was provided a 100-ml Erlenmeyer flask equipped similarly to Example 1 and having, in addition, at the upper part of the flask an opening fitted with a rubber stopper; a solvent mixture of 35 ml of n-hexane, 35 ml of petroleum ether, and 15 ml of i-pentane; an emulsifier mixture of 2.1 g of sorbitan monostearate (Span 60) and 0.9 g of polyoxyethylene (5 mol) stearyl ether; and a monomer-water mixture (hereinafter called monomer composition) of 9 ml of acrylic acid, 5 ml of water, and caustic soda of 60 mol% of the acrylic acid.

Said solvent mixture was put into the flask, and 6 ml of said monomer composition with 0.001 g of ammonium persulfate dissolved therein was added to it. The contents of the flask were heated to 45° C under continuous stirring and observed to have started the reaction, the same as Example 1.

From 40 min after the temperature was elevated to 45° C, the rest of the monomer composition of 12 ml was added stepwise by means of an injector through the inlet rubber stopper into the flask at a rate of 2 ml every 30 min.

After 6 hr of reaction including an additional 2 hr of heating and stirring after the completion of the monomer-composition addition, the contents were transferred into another flask and the solvents were distilled off.

The residue was washed several times with acetone and vacuum-dried to give a purified polymer, which consisted of

| | |
|---|---|
| agglomerates of powder (polymerized under dispersed condition, agglomerated during drying, but readily crushable) | 10.2 g |
| agglomerates (produced during polymerization) | 0.4 g |

The 0.2% aqueous solution of the powdery polymer gave a viscosity of 110 cp at 20° C by Brookfield viscometer.

A monomer composition of 5.6 g of acrylamide, 2.4 g of acrylic acid, 1.35 g of NaOH, and 4.5 g of water was reacted in the same manner as the above, in place of the acrylic acid-NaOH-water mixture, for 8 hr to give acrylamide acrylic acid copolymer. The result was:

| | |
|---|---|
| powdery polymer (polymerized under dispersed condition) | 8.2 g |
| agglomerates (produced during polymerization) | 0.2 g |

The viscosity of 0.2% aq. solution of the powdery polymer was 66 cp at 20° C by Brookfield viscometer.

EXAMPLE 4

The same composition of acrylic acid, NaOH, and water was polymerized in the same manner as in Example 3, but without use of any initiator. The purified polymer obtained consisted of

| | |
|---|---|
| powdery polymer | 6.3 g |
| aggregates | 0.6 g |

EXAMPLE 5

A monomer composition of 9 g of acrylamide and 3 g of water was polymerized in the same way as Example 3, but without use of any initiator. The obtained polymer was

| | |
|---|---|
| powdery polymer | 6.8 g |
| agglomerates | 0.6 g |

As shown in Examples 4 and 5, the process according to the invention gives a good polymer even without use of any polymerization initiator.

EXAMPLE 6

A 100-ml Erlenmeyer flask provided, like Example 1, with a reflux condenser and packed column at its top, an opening with a rubber stopper at the upper part, and a magnetic stirrer inside was placed in a water bath. The reagents employed were a mixed solvent of 41 vol% n-hexane, 41 vol% petroleum ether having a boiling range from 30° to 70° C, and 18 vol% i-pentane; a mixed emulsifier of 70 wt% sorbitan monooleate and 30 wt% polyethylene (5 mol) stearyl ether; and a monomer composition of 65 wt% acrylamide and 35 wt% water mixed with 0.5 wt% ammonium chloride based on the composition, as a buffer, and controlled to pH 7.5 with sodium carbonate.

Twenty milliliters of the mixed solvent was placed in the flask and 5 g of the monomer composition was emulsified in it with 4 g of the emulsifier by stirring. Then, 0.004 g of benzoyl peroxide was added, and the temperature was raised to 45° C under continuous stirring, whereupon part of the solvent mixture was evaporated and filled the flask to expel air to remove oxygen and was condensed by the condenser to drop down, thus establishing stationary reflux.

Separately, 40 g of the monomer composition was emulsified in 30 ml of the mixed solvent with 0.5 g of the emulsifier and, while being kept agitating slowly, added stepwise by means of an injector through the inlet rubber stopper into the flask in amounts each 7 ml for every 40 min, from one hour after the temperature was elevated.

After 5 hr from the start of reaction, a sample was taken from the system, and the concentration of the polymer in the latex particles was determined according to said method, which gave a value of 32%.

The contents of the flask were further reacted for 3 hr after the addition of the emulsion of the monomer composition was completed, and transferred into another vessel to distill off the solvents. The distillation residue was extracted and washed several times with a fifty-to-fifty mixture of acetone and methylethyl ketone and lightly powdered after being vacuum-dried.

The total amount of the monomer composition used in the reaction was 45.2 volume% of the total amount of the reactant mixture. The product obtained after drying and powdering was powdery polymer (containing about 8% moisture) 31.3 g agglomerates (mostly stuck to the vessel walls) 0.3 g Thus, an excellent result was obtained namely, that the yield of powdery polymer was 99% of the total.

The viscosity of 0.2% aqueous solution of the powdery polymer was 18 cp at 20° C by Brookfield viscometer.

Thirty milliliters of water dispersed with diatomaceous earth at a concentration of 3% was filled in a test tube with an inside diameter of 15 mm and a height of 180 mm, and said solution of powdery polymer was added to a concentration of 2 ppm of the polymer. Then the test tube was inverted ten times each for every 2 sec and allowed to stand still, in order to examine the sedimentation velocity. The result was 170 mm/min. The clarity of the supernatant liquid was excellent and thus indicated that this polymer has excellent properties as a nonionic high-polymeric flocculant, effecting a remarkable function when used in small quantities.

EXAMPLE 7

A monomer composition of 38.3 wt% acrylamide, 16.7 wt% acrylic acid, 7.4 wt% caustic soda, and 37.6 wt% water was reacted in the same reaction vessel by use of the same solvent mixture and emulsifier as Example 6 and with an initiator comprising 0.004 g of benzoyl peroxide and its 1/10 mol equivalent of dimethylaniline. The molar ratio of acrylamide and acrylic acid was 70:30, and the quantity of caustic soda was equivalent to 80 mol% of acrylic acid.

The reaction was carried out in similar manner to Example 6. Five grams of the monomer composition, 20 ml of the mixed solvent, and 4 g of the emulsifier were emulsified in the Erlenmeyer flask together with said initiator, and from one hour after the polymerization had started with raised temperature of 45° C, a quantity of 7 ml of the emulsion of 40 g of the monomer composition separately emulsified in 30 ml of the mixed solvent with 0.5 g of the emulsifier, was introduced into the flask every 40 min.

The polymer concentration in the dispersed particles 5 hr after the start of polymerization was 36%.

The total amount of the monomer composition used in the reaction was 45.2 volume% based on the total amount of the reaction mixture.

The product obtained was

| | |
|---|---|
| powdery polymer (about 11% moisture) | 30.8 g |
| agglomerates | 0.5 g |

The agglomerates comprised only 1.6% of the powdery polymer.

The viscosity of 0.2% aqueous solution of the powdery polymer was 62 cp at 20° C by Brookfield viscometer.

The sedimentation velocity was measured with respect to magnesium hydroxide, which forms a cationic suspension in water, suspended at a concentration of 2% in water, in similar manner to Example 6 by adding said aq. solution of powdery polymer to a concentration of 4 ppm of the polymer. The value obtained was 60 mm/min, and the clarity of the supernatant liquid was perfect showing the excellent performance of the polymer as an anionic high-polymeric flocculant.

EXAMPLE 8

The same reaction vessel, solvent mixture, and emulsifier as in Example 6 were provided.

A monomer composition comprising 26 g of acrylamide, 6.5 g of 2-(dimethylamino)ethylmethacrylate, and 17.5 g of aq. hydrochloric acid containing an amount of hydrogen chloride equivalent to 80 mol% of the 2-(dimethylamino)ethylmethacrylate, was emulsified in 30 ml of the mixed solvent with 0.5 g of the emulsifier and held under continuous stirring.

On the other hand, 20 ml of the solvent mixture, 4.5 g of the emulsifier, and 0.004 g of benzoyl peroxide were stirred and heated to 45° C in the reaction vessel, whereupon part of the mixed solvent evaporated and expelled the air in the vessel.

After the temperature had reached to 45° C, 10 ml of said emulsion of monomer composition was added into the flask and subsequently 10 ml portions of the emulsion of monomer composition were added at hourly intervals until several such additions were made. After the addition of the emulsion was completed, the system was further heated and stirred for 3 hr, and the product was purified in similar manner to Example 6.

The result was:

| | | |
|---|---|---|
| concentration of polymer in dispersed particles 5 hr after the start of reaction | 36% | |
| powdery polymer (about 11% moisture) | 36.5 | g |
| agglomerates | 0.5 | g |
| viscosity of 0.2% aq. solution of powdery polymer (Brookfield viscometer, 20° C) | 8 | cp |

The sedimentation test similar to that in Example 6 by use of 30 ml of 3%-solution of graphite powder, which formed an anionic suspension, to which was added said aqueous solution of powdery polymer to a concentration of 2 ppm of the polymer gave a semimentation value of 120 mm/min. The supernatant liquid was perfectly transparent, showing the excellency of the product as a cationic high-polymeric flocculant.

EXAMPLE 9

A monomer composition of 45.5% wt% acrylamide, 19.5 wt% methacrylamide, and 35 wt% water was polymerized in the same way by use of the same mixed solvent, emulsifier, and initiator, in the same reaction vessel as Example 6.

The product was

| | |
|---|---|
| powdery polymer (about 8% moisture) | 29.8 g |
| agglomerates | 0.4 g |

The viscosity of 0.2% aq. solution of the powdery polymer was 10 cp at 20° C by Brookfield viscometer.

EXAMPLE 10

A monomer composition of 54 wt% acrylamide, 6 wt% N-vinylpyrrolidone, and 40 wt% water was polymerized in the same way by use of the same mixed solvent, emulsifier, and initiator, in the same reaction vessel as Example 6.

The product obtained was

| | |
|---|---|
| powdery polymer (about 8% moisture) | 28.4 g |
| agglomerates | 0.6 g |

The viscosity of 0.2% aq. solution of the powdery polymer was 6 cp at 20° C by Brookfield viscometer.

EXAMPLE 11

A monomer composition of 54 wt% acrylamide, 6 wt% allyl amine, and 40 wt% aq. hydrochloric acid containing an amount of hydrogen chloride equivalent to 60 mol% of the allyl amine was polymerized in the same manner by use of the same mixed solvent, emulsifier, and initiator, in the same reaction vessel as Example 6.

The product was

| | |
|---|---|
| powdery polymer (about 10% moisture) | 26.7 g |
| agglomerates | 2.1 g |

The viscosity of the 0.2% aq. solution of the powdery polymer was 4 cp at 20° C by Brookfield viscometer.

EXAMPLE 12

A monomer composition composed 65 wt% of a mixture of acrylamide and N,N'-methylene-bis-acrylamide equivalent to 1/1000 mol of the acrylamide and 35% of water was polymerized by reversed-phase emulsion polymerization in the same way by use of the same solvent mixture, emulsifier, and initiator, in the same reaction vessel as Example 6.

The product was

| | |
|---|---|
| powdery polymer (about 8% moisture) | 31.8 g |
| agglomerates | 0.3 g |

The viscosity of 2.5% aqueous solution of the powdery polymer was about 20 cp at 20° C by Brookfield viscometer.

Such relatively low viscosity of high-concentration solution of the polymer in comparison with other Examples indicates that cross linking by N,N'-methylenebis-acrylamide has occurred in the dispersed polymer particles.

EXAMPLE 13

The same monomer composition as Example 6 was polymerized by reversed-phase emulsion polymerization by use of n-pentane (bp. 36.1), benzoyl peroxide as the initiator, and the same emulsifier, in the same reaction vessel as Example 6.

Three grams of the monomer composition was emulsified into a mixture of 20 ml of n-pentane, 5.5 g of the emulsifier, and 0.006 g of benzoyl peroxide in the reaction vessel, and the temperature was raised to 37° to 39° C and held there under stirring by the water bath, whereupon part of the solvent was evaporated and condensed at the condenser in stationary reflux and the reaction was started in the similar manner to other Examples.

From 40 min after the start of the reaction, 42 g of monomer composition emulsified in 30 ml of n-pentane by means of 0.5 g of the emulisifier was added into the system stepwise in portions each 5 ml every 30 min. The contents of the flask was further heated and agitated for 3 hr after addition of the monomer composition to complete the reaction and was purified and dried in the same manner as Example 6.

The results were:

| | | |
|---|---|---|
| concentration of polymer in dispersed particles 5 hr after the start of reaction | 38% | |
| powder polymer (8% moisture) | 31.3 | g |
| agglomerates | 0.3 | g |

The viscosity of 0.2% aq. solution of powdery polymer was 8 cp at 20° C by Brookfield viscometer.

What I claim is:

1. A process for producing powdery, water-soluble, vinyl polymers having a high degree of polymerization, by W/O emulsion polymerization, which comprises the steps of: in a reaction vessel having a reflux condenser at its top, forming a reaction mixture consisting essentially of (1) an oil phase consisting essentially of a mixture of at least two non-polar organic solvents which are soluble with each other, and substantially immiscible with water and which have different boiling points, said solvent mixture having a boiling temperature in the range of from 30° to 60° C, said boiling temperature being in the temperature range for effecting polymerization of water-soluble vinyl monomers, (2) a W/O emulsifier and (3) a water phase consisting essentially of an aqueous solution of a water-soluble vinyl monomer or mixture of said monomers, said emulsifier being effective to emulsify said water phase in said oil phase, the amount of said water phase being less than twice the amount of said emulsifier whereby said water phase is solubilized by said emulsifier and is dispersed in said oil phase to form a W/O emulsion;

heating said W/O emulsion reaction mixture to the boiling temperature of said solvent mixture, and simultaneously agitating said reaction mixture, and maintaining said reaction mixture at said boiling temperature under stable reflux conditions to start polymerization of said monomer to form vinyl polymer in the dispersed water phase of said reaction mixture; and then intermittently or continuously adding to said reaction mixture, while it is maintained under said reflux and agitation and in said W/O emulsion state, additional quantities of said aqueous solution of water-soluble vinyl monomer whereby to effect polymerization of said monomer, said additional quantities being added at such a rate that the concentration of the vinyl polymer present in the dispersed water phase of said W/O emulsion reaction mixture is continuously maintained at not less than 20 percent by weight, based on the weight of the water phase of said reaction mixture, during said adding step and until completion of the polymerization period.

2. A process according to claim 1 in which said additional quantities of said aqueous solution of water-soluble vinyl monomer are added to said reaction mixture in the form of a dispersion of said aqueous solution in a similar solvent mixture and a similar emulsifier prepared outside of said reaction vessel.

3. A process according to claim 1, wherein said mixture of nonpolar organic solvents is a petroleum fraction having a boiling point range.

4. A process according to claim 1, wherein an oil-soluble polymerization initiator is dissolved in said solvent mixture provided in said vessel before the reaction is started.

5. A process according to claim 1, wherein a water-soluble polymerization initiator is dissolved in the water phase that is dispersed in the oil phase in said vessel before the polymerization is started.

6. A process according to claim 1, wherein the amount of said emulsifier is in the range from 1 to 20% by weight, based on the total amount of said vinyl monomer to be polymerized.

7. A process according to claim 2 in which the total amount of emulsifier added before polymerization begins and with said additional quantities is in the range of from 1 to 20% by weight, based on the total amount of said vinyl monomer added before polymerization begins and with said additional quantities.

8. A process according to claim 1, wherein said water-soluble vinyl monomer is selected from the group consisting of acrylamide, methacrylamide, acrylic acid and salts thereof, 2-(dimethylamino)-ethyl methacrylate and salts thereof, 2-(dimethylamino)ethylacrylate and salts thereof, a mixture of the foregoing compounds, and a mixture of the foregoing compounds with other water-soluble vinyl monomers.

9. A process according to claim 2, wherein said water-soluble vinyl monomer is selected from the group consisting of acrylamide, methacrylamide, acrylic acid and salts thereof, 2-(dimethylamino)-ethyl methacrylate and salts thereof, 2-(dimethylamino)ethylacrylate and salts thereof, a mixture of the foregoing compounds, and a mixture of the foregoing compounds with other water-soluble vinyl monomers.

* * * * *